United States Patent [19]

Folga et al.

[11] Patent Number: 5,083,816
[45] Date of Patent: Jan. 28, 1992

[54] MACHINE AND HUMAN READABLE LABEL

[75] Inventors: Edward S. Folga, Sedalia; Daniel A. Benade, Lakewood, both of Colo.

[73] Assignee: Engineered Data Products, Inc., Broomfield, Colo.

[21] Appl. No.: 549,281

[22] Filed: Jul. 6, 1990

[51] Int. Cl.[5] .............................................. B42D 15/00
[52] U.S. Cl. .................................... 283/81; 283/36; 283/37; 283/41; 283/114; 235/462
[58] Field of Search ................. 283/81, 35, 36, 37, 283/41, 114; 235/462

[56] References Cited

U.S. PATENT DOCUMENTS

| | | | |
|---|---|---|---|
| 4,204,639 | 5/1980 | Barber et al. | 235/462 |
| 4,544,182 | 10/1985 | Spring | 283/81 |
| 4,844,509 | 7/1989 | Kasprzak et al. | 283/81 |
| 4,889,982 | 12/1989 | Young et al. | 283/81 |

Primary Examiner—Timothy V. Eley
Assistant Examiner—David P. Bryant
Attorney, Agent, or Firm—James R. Young

[57] ABSTRACT

Disclosed is a human and machine readable label which is divided into three areas. The top portion of the label, which is typically half the length of the label, is divided into two columns. One of these columns contains a bar code with a quiet zone at each end of the bar code. This bar code contains the entire message of the label in a machine readable bar code format. The other column of the top portion of the label contains the first few characters of the human readable portion of the message. The bottom portion of the label contains the remainder of the human readable message and is printed throughout the entire width of the label, thus allowing the characters to be a much larger size that the human readable characters contained in the top portion of the label. The label is of a size that allows it to be placed on one end of a 3480 style tape cartridge, as well as allowing it to be placed on other types of media such a file folders. The human readable characters contained on the label have a background color which is different for each letter or digit of the human readable message. Since the background color is different for each letter or number, out of sequence cartridges are very easy to spot on a shelf. Furthermore, because the lower portion of the label contains much larger letters than the upper portion of the label, it is much easier to discern the message on the label at a longer distance. Also, the larger letters of the bottom portion have a larger colored background area which further aids in distinguishing out-of-sequence cartridges.

10 Claims, 2 Drawing Sheets

MACHINE AND HUMAN READABLE LABEL

BACKGROUND OF THE INVENTION

This invention relates to storage media labels, and more particularly to a coded label that is both machine readable and human readable.

Machine readable bar codes have become commonplace today, virtually every prepackaged food product or household product sold in supermarkets has a bar code printed on its package. The bar codes are read by electronic readers at the checkout counters. This not only speeds the process of customer check-out, but has become a valuable asset in inventory control.

With the advent of automated systems that will retrieve tape cartridges from a library, labels having both a human readable portion, and a machine readable portion, have been adapted for being placed on magnetic tape cartridges. For example, the label of U.S. Pat. No. 4,844,509, issued July 4, 1989 to Kasprzak, et al., is commonly placed on tape cartridges suitable for use in the IBM 3480 Magnetic Tape Subsystem. While this label can be read by some automated tape retrieval systems, the bar code on this label contains a serious drawback for reading by a conventional bar code reader. Conventional bar code readers require a "quiet zone" at each end of the bar code. This quiet zone is a long, light-colored area, approximately the length of two bar code characters. The label of U.S. Pat No. 4,844,509 does not have such a quiet zone, and is therefore difficult to read using conventional bar code readers.

A further problem introduced by the label of this patent, is that the human readable code must be made smaller in order to accommodate the bar code on one side of the label. This makes label reading more difficult if the person reading the label is standing at a distance from the label.

There is need in the art then for a label having a bar code with a quiet zone to allow such a label to be read by a conventional bar code reader. There is further need in the art for such a label to have larger human readable characters that can be read from a greater distance.

SUMMARY OF THE INVENTION

It is an object of the present invention to provide a label for storage media, file folders and the like having a message that can be read visually by a human and can also be read by a machine.

It is another object of the invention to provide such a label wherein the message is arranged as a pair of codes, one that is human readable and one that is machine readable, and further wherein both codes contain the same message.

Yet another object is to provide such a label that is divided into a top and bottom portion.

Another object is to provide such a label wherein the top portion is further divided into two columns, with a portion of the human readable code being arranged in a first of the two columns, and the complete machine readable code arranged in the second of the two columns.

Another object is to provide such a label wherein the bottom portion contains the remainder of the human readable code.

Still another object is to provide a label wherein the characters contained in the bottom portion of the code are larger than the human readable code characters contained in the top portion.

A further object is to provide such a label with the machine readable code being a bar code.

A still further object is to provide such a label wherein the bar code has a quiet zone at each end of the code that is large enough to accommodate standard bar code readers.

The above and other objects of the invention are accomplished in a label which is divided into three areas. The top portion of the label, which is typically half the length of the label, is divided into two columns. One of these columns contains the bar code with a quiet zone at each end of the bar code. This bar code contains the entire message of the label in a machine readable bar code format. The other column of the top portion of the label contains the first few characters of the human readable portion of the message. The bottom portion of the label contains the remainder of the human readable message and is printed throughout the entire width of the label, thus allowing the characters in the bottom portion to be a much larger size that the human readable characters contained in the top portion of the label.

The label is of a size that allows it to be placed on one end of a 3480 style tape cartridge, as well as allowing it to be placed on other types of media such a file folders. The human readable characters contained on the label have a background color which is different for each letter or digit of the human readable message and thus presents the message in a third code. Since the background color is different for each letter or number, out of sequence cartridges are very easy to spot on a shelf. Furthermore, because the lower portion of the label contains much larger letters than the upper portion of the label, it is much easier to discern the message on the label at a longer distance. Also, the larger letters of the bottom half have a larger colored background area which further aids in distinguishing out-of-sequence cartridges.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In general, the label of the present invention contains a message displayed in three codes. A first code is a machine readable code such as a bar code, a second code is in a human readable form showing letters and digits. A third code, consisting of background colors behind the human readable code, provides additional visual indication of sequencing of the media to which the labels are attached.

Figure 1:
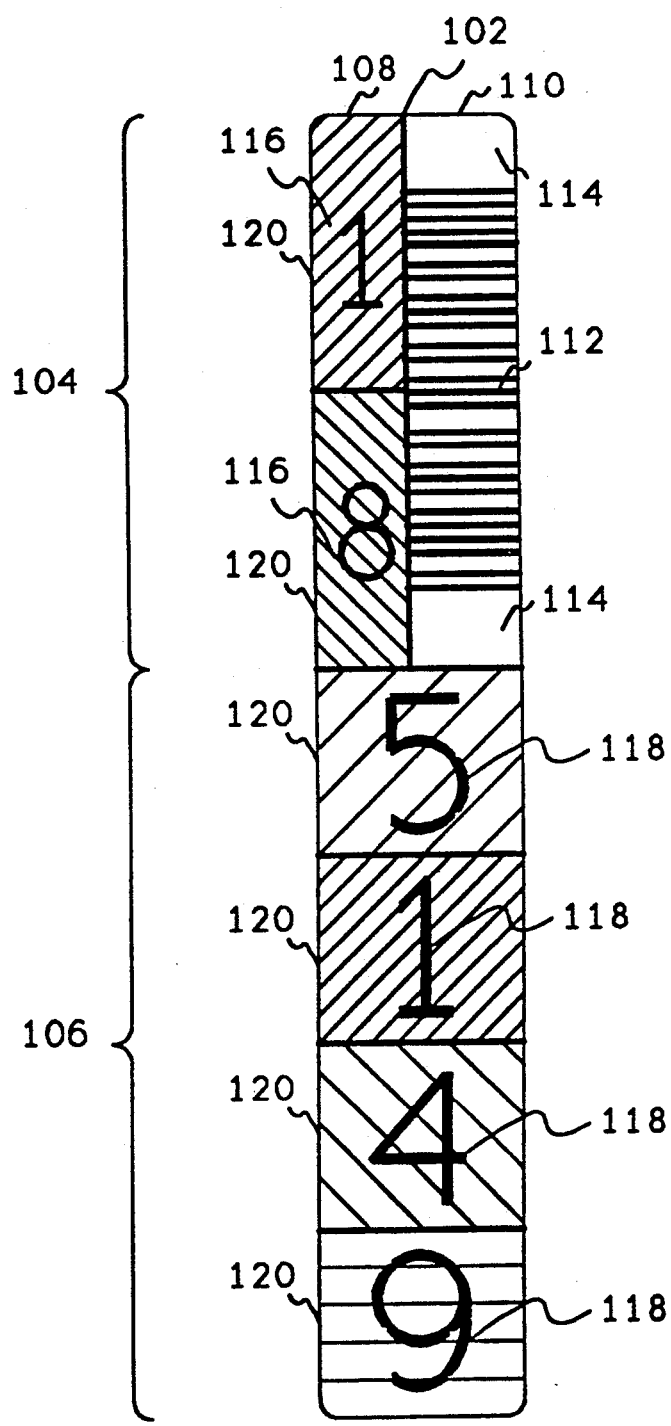
FIG. 1 shows the machine and human readable label.

FIG. 1 shows the machine and human readable label of the present invention. Referring now to FIG. 1, a label 102 is shown being divided into a top portion 104 and a bottom portion 106. The top portion 104 is divided into a pair of columns 108 and 110. Column 110 contains a machine readable code 112, typically a bar code, which has a quiet zone 114 at each end.

The first column 108 contains the first portion of the human readable code, here indicated by two letters/numbers 116. Each of the letters/numbers 116 is printed over a background color 120, which will be color-coded for each letter or number. Each unique letter or number used on a label will also have a unique background color. That is, a given letter or number will have the same background color for all labels.

The bottom half 106 of the label 102 contains the remaining characters of the human readable code, here indicated by the number characters 118. Each of the letters or numbers printed on the bottom half 106 of the label will also have a background color 120. Because the bottom half 106 of the label contains characters that are printed across the entire width of the label, the characters in 118 in the bottom half 106 of the label 102 are much larger than the human readable characters 116 in the first column 108 of the top half 104 of the label 102. Similarly, the area covered by the background color 120 of the bottom half 106 of the label 102 cover a much larger area than the background colors in the top half 104 of the label.

The bar code 112 is printed in a dark color, and the background of column two 110 of the top half of the label is printed in a light color, typically white.

Although the human readable code in FIG. 1 is shown having two letters or numbers in the top half 104, and four letters or numbers in the bottom half 106, the invention is not so limited. The label may have more or less than six letters or numbers, and the quantity of letters or numbers in the top half may be different from the quantity of letters or numbers in the bottom half. That is, for example, the label might contain eight letters or numbers in human readable code, with three in the top half and five in the bottom half.

Figure 2:
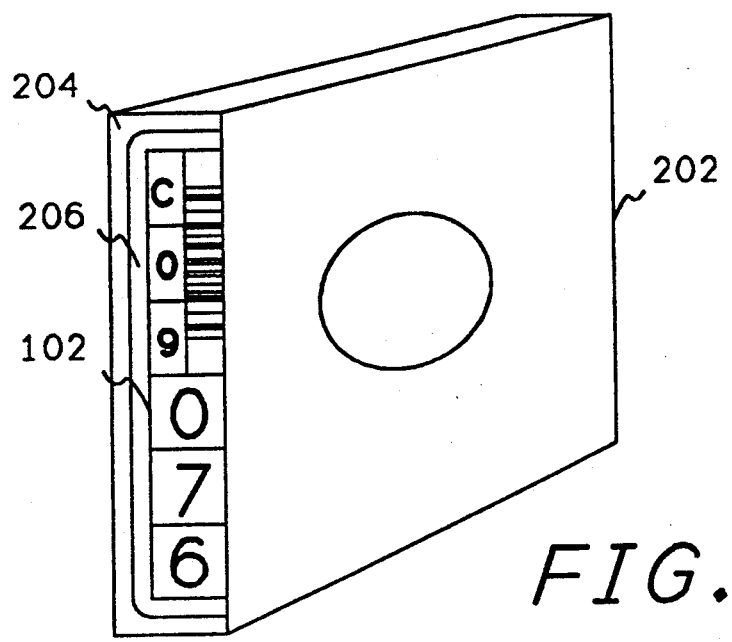
FIG. 2 shows the label as affixed to a tape cartridge.

FIG. 2 shows the label as it is affixed to a tape cartridge. Referring now to FIG. 2, a tape cartridge 202 is shown having a front portion 204 with a label 102 affixed thereto. The label 102 is mounted within a recessed portion 206 on the cartridge 202. The label 102 is shown having three letters in the top half and three letters in the bottom half.

Figure 3:
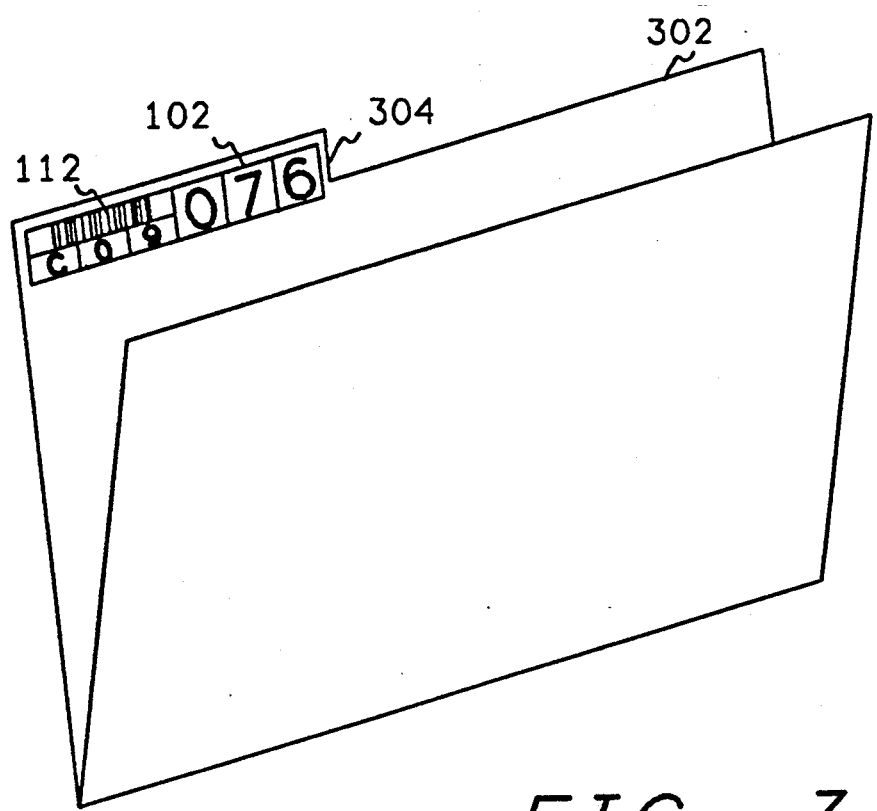
FIG. 3 shows the label as affixed to a file folder.

FIG. 3 shows the label affixes to a standard file folder. Referring now to FIG. 3, a file folder 302 contains a tab 304 with the label 102 affixed thereto. In this figure, the human readable characters are turned ninety degrees from the label in FIG. 1 to provide a more conventional reading direction for a person reading this type of label. The bar code 112 is located on the top portion of the label, to more easily allow a bar code reader to scan the label while the file folder remains in a hanging file folder.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A pre-printed label for use with data processing storage media or file folders comprising:
a base material having a message printed thereon;
a first horizontal row comprising
a first vertical column containing said message in a machine readable code, and
a second vertical column containing a first part of said message printed in a human readable code; and
a second horizontal row comprising a second part of said message printed in a human readable code wherein the human readable code printed in said second horizontal row is printed across the entire width of said label whereby symbols of said human readable code are larger than symbols of said human readable code in said second column of said first horizontal row.

2. The label of claim 1 further comprising:
printing a background color around said human readable code wherein said background color comprises a third code comprising a different color for each of a plurality of symbols contained in said human readable code.

3. The label of claim 1 wherein symbols of said human readable code are printed vertically along the longitudinal axis of said label.

4. The label of claim 1 wherein symbols of said human readable code are printed horizontally along the longitudinal axis of said label.

5. The label of claim 1 wherein said machine readable code comprises a bar code.

6. The label of claim 5 wherein a quiet zone is appended to each end of said machine readable code.

7. A pre-printed label for use with data processing storage media or file folders comprising:
a base material having a message printed thereon;
a first horizontal row comprising
a first vertical column containing said message in a machine readable code comprising
a bar code printed in the center of said first vertical column, and
a quiet zone, containing no symbols, at each end of said bar code, and
a second vertical column containing a first part of said message printed in a human readable code; and
a second horizontal row comprising a second part of said message printed in a human readable code; wherein the human readable code printed in said second horizontal row is printed across the entire width of said label whereby symbols of said human readable code are larger than symbols of said human readable code in said second column of said first horizontal row.

8. The label of claim 7 further comprising:
a background color around said human readable code wherein said background color comprises a third code comprising a different color for each of a plurality of symbols contained in said human readable code 9. The label of claim 7 wherein symbols of said human readable code are printed vertically along the longitudinal axis of said label.

10. The label of claim 7 wherein symbols of said human readable code are printed horizontally along the longitudinal axis of said label.

* * * * *